(12) United States Patent  
Chen et al.

(10) Patent No.: US 9,122,421 B2  
(45) Date of Patent: Sep. 1, 2015

(54) CONNECTING PART OF STORAGE DEVICE

(71) Applicant: PHISON ELECTRONICS CORP., Miaoli (TW)

(72) Inventors: Chang-Chih Chen, Hsinchu County (TW); Wei-Hung Lin, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 56 days.

(21) Appl. No.: 14/069,397

(22) Filed: Nov. 1, 2013

(65) Prior Publication Data  
US 2015/0087167 A1 Mar. 26, 2015

(30) Foreign Application Priority Data  
Sep. 26, 2013 (TW) .............................. 102218037 U

(51) Int. Cl.  
    *H01R 31/06* (2006.01)  
    *G06F 3/08* (2006.01)  
    *H01R 13/6582* (2011.01)  
    *H01R 13/506* (2006.01)

(52) U.S. Cl.  
    CPC .............. *G06F 3/08* (2013.01); *H01R 13/6582* (2013.01); *H01R 31/065* (2013.01); *H01R 13/506* (2013.01); *H04N 2201/216* (2013.01)

(58) Field of Classification Search  
    CPC .......... H01R 31/06; H01R 27/02; H01R 27/00  
    USPC ........................................... 439/638, 660, 300  
    See application file for complete search history.

(56) References Cited

U.S. PATENT DOCUMENTS

| | | | |
|---|---|---|---|
| 8,535,102 B1* | 9/2013 | Colahan et al. ................ | 439/638 |
| 2003/0100203 A1* | 5/2003 | Yen ................................. | 439/79 |
| 2010/0226509 A1* | 9/2010 | Filson et al. .................... | 381/105 |
| 2011/0219159 A1* | 9/2011 | Park ............................... | 710/300 |
| 2013/0328484 A1* | 12/2013 | Villarreal et al. ............. | 315/127 |
| 2014/0057495 A1* | 2/2014 | Liao et al. ...................... | 439/660 |
| 2014/0273581 A1* | 9/2014 | McSweyn ...................... | 439/300 |

\* cited by examiner

Primary Examiner — Truc Nguyen  
(74) Attorney, Agent, or Firm — Jianq Chyun IP Office

(57) ABSTRACT

A connecting part of a storage device including a body, a plurality of connecting terminals, and a grounding member is provided. The body has a first end and a second end opposite to each other. The connecting terminals are disposed at the first end and the second end respectively. The grounding member is assembled to the body. At least a part of the grounding member extends from one of the first and the second ends to another one of the first and the second ends. The connecting part of the storage device is grounded by contacting the grounding member to a connector of an external device when the connecting part of the storage device is connected to the connector of the external device.

10 Claims, 5 Drawing Sheets

CONNECTING PART OF STORAGE DEVICE

CROSS-REFERENCE TO RELATED APPLICATION

This application claims the priority benefit of Taiwan application serial no. 102218037, filed on Sep. 26, 2013. The entirety of the above-mentioned patent application is hereby incorporated by reference herein and made a part of this specification.

BACKGROUND OF THE INVENTION

1. Field of the Invention

The invention generally relates to a connecting part of a storage device.

2. Description of Related Art

With the developments of multimedia technology, storage capacity required for digital data goes larger and larger. Conventional floppy disk in 1.44 MB features in its portable characteristic but still fails to meet the requirement of large storage capacity. Although a conventional hard disk provides a large storage capacity, it still suffers in bulk size which leads to inconvenient carrying. Recently, with the popularization of the universal serial bus (USB) interface and the reduction of the price of the flash memory, USB flash disks advantaged in large storage capacity, high compatibility and portability are broadly applied in data transmission between various computers and storage devices.

The flash disk featuring in large storage capacity, plug-and-play, compact size and portability has taken the place of the floppy disk. Generally, the flash disk is electrically connected to a computer host and a storage device through a connector (e.g., a USB plug or an IEEE 1394 plug).

However, at present days, many types of connectors are provided for an electronic device, yet a safety measure that a grounding terminal is not adopted by the flash drive. Accordingly, when the flash drive is connected to a corresponding slot on the electronic device through a connector or a related converting connector, interferences of static discharge effect or electromagnetic noise cannot be prevented.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The invention provides a connecting part of a storage device capable of accomplishing a grounding effect by using a grounding member extended to cross connecting interfaces.

The invention provides a connecting part of a storage device capable of producing a grounding effect by connecting a part of a conductive body exposed outside of a shell to a corresponding connector.

A connecting part of a storage device of the invention includes a body, a plurality of connecting terminals, and a grounding member. The body has a first end and a second end opposite to each other. The connecting terminals are disposed at the first end and the second end respectively. The grounding member is assembled to the body. At least a part of the grounding member extends from one of the first and the second ends to another one of the first and the second ends. The connecting part of the storage device is grounded by contacting the grounding member to a connector of an external device when the connecting part of the storage device is connected to the connector of the external device.

A connecting part of a storage device of the invention is provided and adapted to be electrically connected to an external device. The connecting part of the storage device includes a first connecting interface of the storage element and a first shell. The first connecting interface is configured to connect a second connecting interface of the external device. The first connecting interface is disposed in the first shell. The first shell has a first grounding interface, and the first shell is configured to connect the external device to connect the first connecting interface to the second connecting interface and connect the first grounding interface to a second grounding interface of the external device.

In summary, in the exemplary embodiments of the invention, the connecting part of the storage device adopts the grounding member capable of crossing the connecting terminals, such that when the storage device is connected to the external device, the grounding member can be electrically connected to a grounding interfaces of the connector of the external device, thereby producing the grounding effect for the two devices connected to each other. Furthermore, when the storage device performs the conversion for different connecting interfaces by using the connecting part, a status in which the storage element and the connector of the external device are both grounded and electrically connected together may be obtained by using the grounding member of the connecting part. Therefore, the static discharge effect can be effectively prevented.

In addition, by using the grounding interface being exposed to the shell disposed on the storage element, the connecting part of the storage device may accomplish the grounding effect by electrically connecting the grounding interfaces when the connecting part of the storage device is connected to the external device through the connector.

In order to make the aforementioned and other features and advantages of the present invention more comprehensible, several exemplary embodiments accompanied with figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
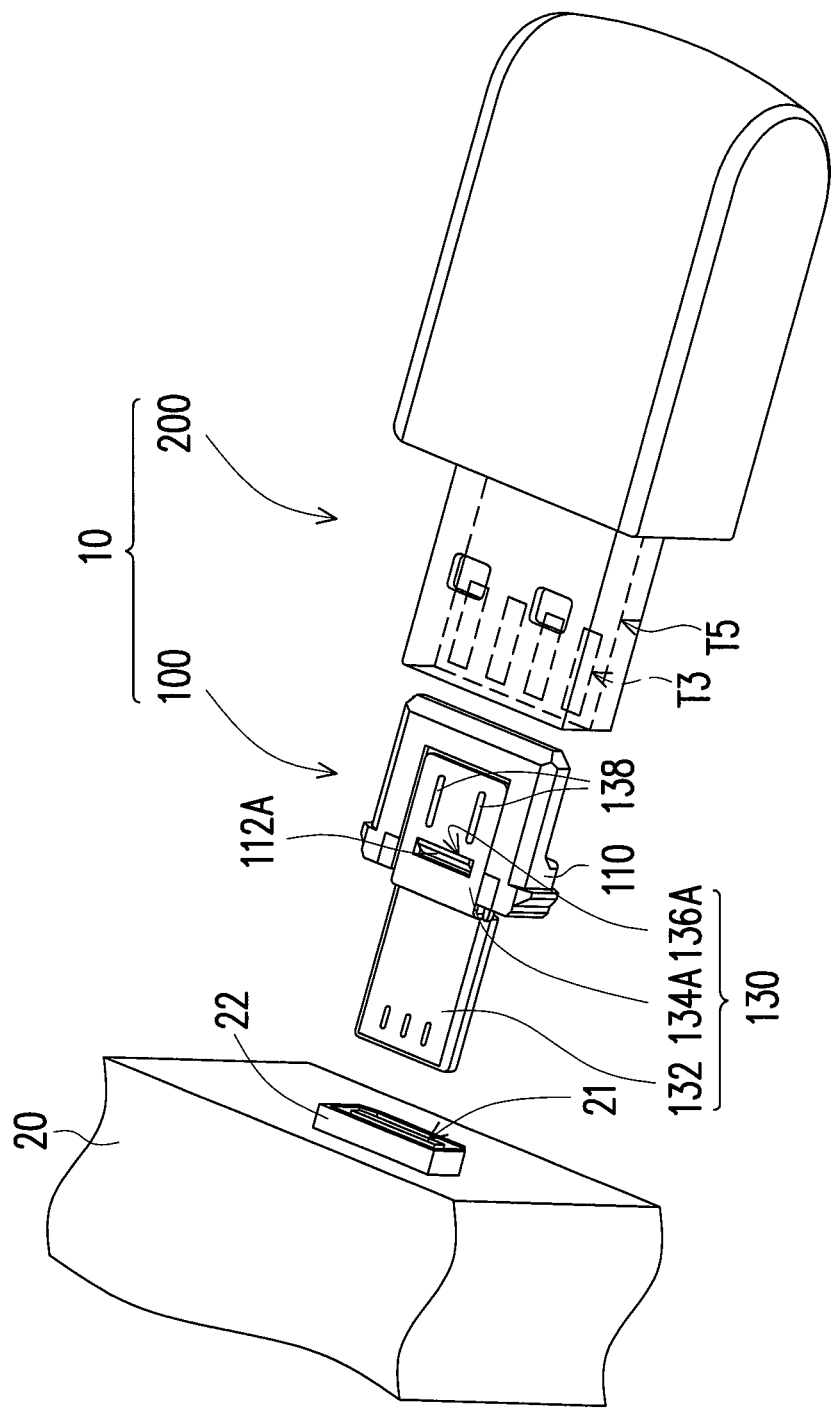
FIG. 1 is a schematic view for using a storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic view for using a storage device according to an exemplary embodiment of the invention. Referring to FIG. 1, a storage device 10 includes a connecting part 100 and a storage element 200. The storage element 200 is a flash memory device which has a connecting interface T3 for connecting to an electronic device (not illustrated) having a corresponding connecting interface. However, in case the electronic device does not have the corresponding connecting interface (e.g., an external device 20 of the invention); the storage element 200 needs to use the connecting part 100 for a conversion of the connecting interface.

As shown in FIG. 1, a connecting interface 21 of the external device 20 does not support the connecting interface T3 of the storage element 200, thus the connecting part 100 is required as a medium for the conversion of the connecting interface, so that the storage element 200 can be successfully connected to the external device 20. Namely, the connecting part 100 of the present embodiment is deemed as a converting connector providing the conversion of the connecting interface to the storage element 200.

Figure 2:
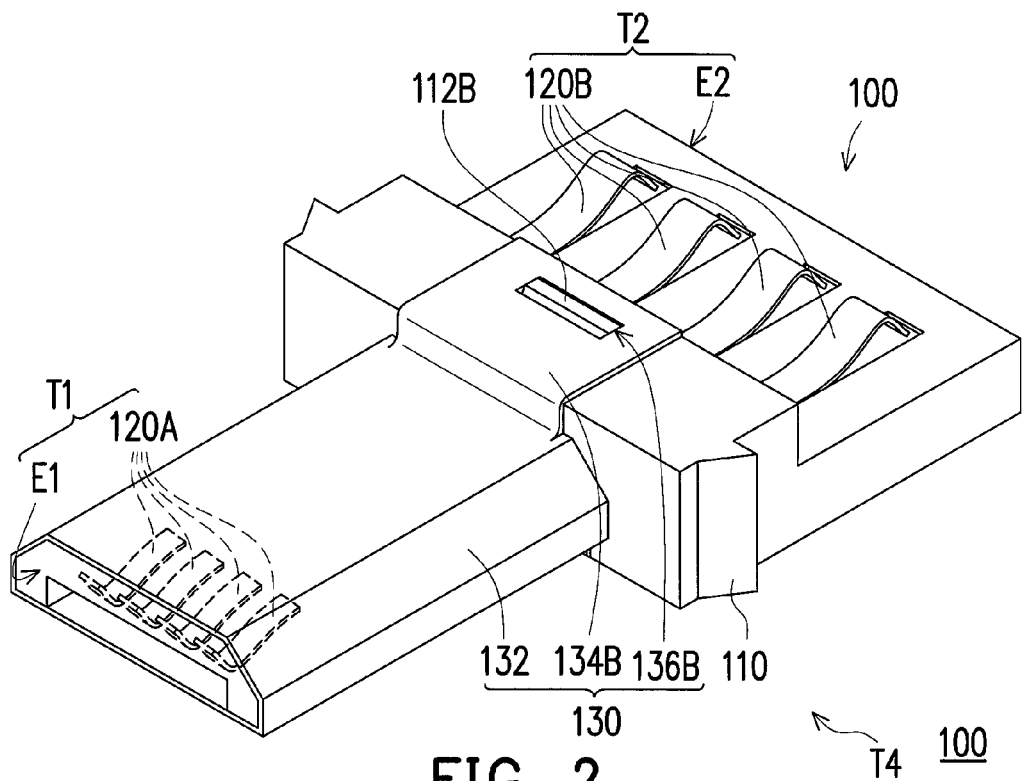
FIG. 2 is a schematic view illustrating the connecting part depicted in FIG. 1 from another perspective.

FIG. 2 is a schematic view illustrating the connecting part depicted in FIG. 1 from another perspective. Referring to FIG. 1 and FIG. 2 together, in the exemplary embodiment, the connecting part 100 includes a body 110, a plurality of connecting terminals 120A and 120B and a grounding member 130. The body 110 has a first end E1 and a second end E2 opposite to each other. The connecting terminals 120A and 120B are disposed at the first end E1 and the second end E2 respectively, electrically connected to each other (which can be done by using a converting circuit to perform the conversion of the connecting interface or said terminals can be directly connected together, and details thereof are not illustrated herein), and simultaneously forming different connecting interfaces T1 and T2 together with the first end E1 and the second E2, respectively. As shown in FIG. 2, the connecting interface T1 which supports micro universal serial bus (Micro-USB) is formed by the connecting terminal 120A disposed at the first end E1 together with the first end E1, and the connecting interface T2 which supports universal serial bus (USB) is formed by the connecting terminal 120B disposed at the second end E2 together with the second end E2. Accordingly, the storage element 200 can be detachably connected to the connecting interface T2 through the connecting interface T3 which supports universal serial bus. Types of the connecting interfaces T1 to T3 are not particularly limited herein, and a designer may change said types appropriately based on usage conditions of the storage device 10. Further, although the terminal that supports USB2.0 standard is illustrated as an example in the present embodiment, the present embodiment is not limited thereto. In another embodiment not illustrated, the connecting interface may also be the connecting terminal that supports USB3.0 standard.

Further, the grounding member 130 of the connecting part 100 is assembled to the body 110, and at least a part of the grounding member 130 extends from one of the first end E1 and the second end E2 towards another one of the first end E1 and the second end E2. It should be noted that, the present exemplary embodiment merely illustrates the part of the grounding member 130 extending from the first end E1 towards the second end E2. Accordingly, the grounding member 130 is capable of crossing to the different connecting interfaces T1 and T2 of the connecting part 100 through an extending structure thereof. In other words, a structural shape of the grounding member 130 is not limited in the present embodiment as long as the extending structure may cross the different connecting interfaces T1 and T2.

More specifically, the grounding member 130 of the present exemplary embodiment includes a socketing portion 132 and extending portions 134A and 134B. The socketing portion 132 is socketed at the first end E1 of the body 110 to cover the connecting terminal 120A disposed at the first end E1, and the extending portions 134A and 134B extend from the socketing portion 132 along two opposite surfaces (upper and lower surfaces as shown in the figure) of the body 110 towards the second end E2, respectively. The body 110 has locking hooks 112A and 112B disposed at the two opposite surfaces respectively, and the extending portions 134A and 134B have buckle holes 136A and 136B respectively. The grounding member 130 may be fixed to the body 110 by locking the locking hooks 112A and 112B to the buckle holes 136A and 136B.

Figure 3:
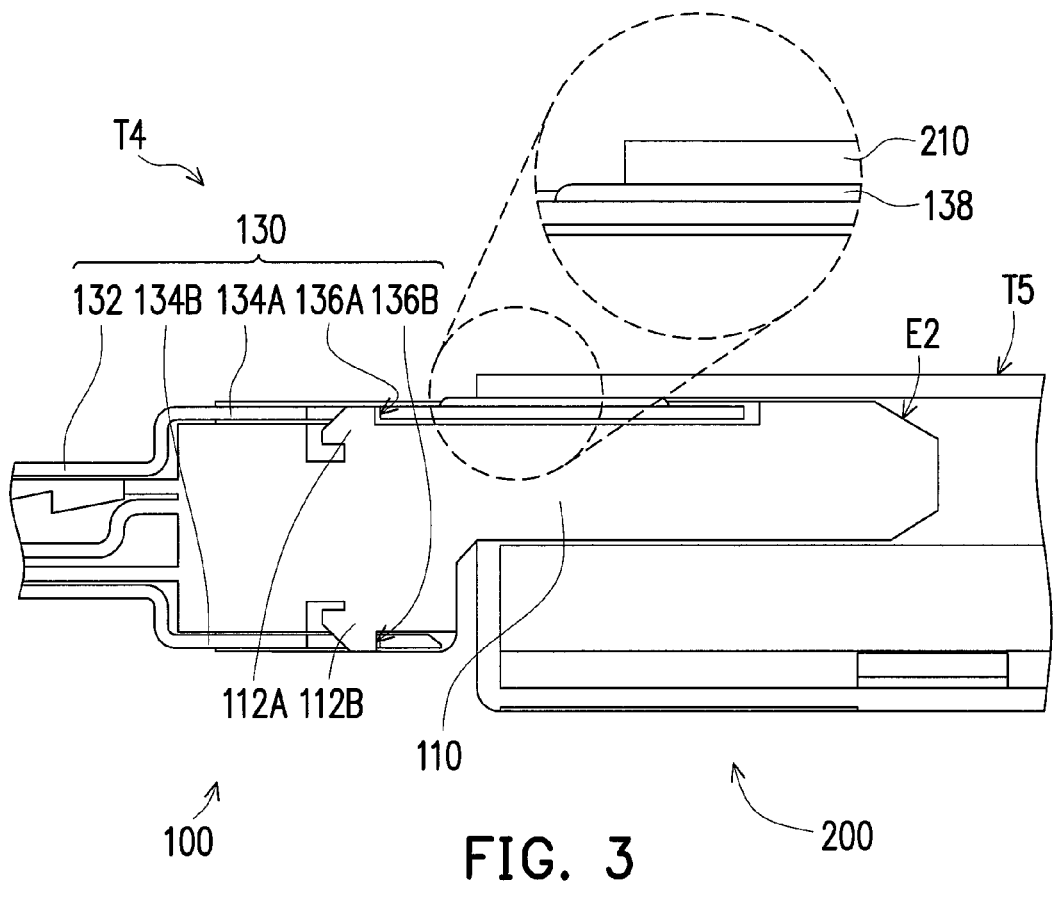
FIG. 3 is a partial cross-sectional view of the storage device depicted in FIG. 1.

FIG. 3 is a partial cross-sectional view of the storage device depicted in FIG. 1. Referring to FIG. 1 to FIG. 3 together, a grounding interface T4 of the connecting part 100 is formed by a structural feature of the grounding member 130. More specifically, the storage element 200 further includes a grounding interface T5 covering the connecting interface T3, such as an external metal shell structure of a USB connector. When the connecting part 100 is detachably connected to the connecting interface T3 of the storage element 200 through the connecting interface T2, the grounding interfaces T4 and T5 are in contact to be electrically connected together. More specifically, the grounding member 130 further includes a protruding portion 138 disposed on the extending portion 134A, and configured to lean against the grounding interface T5 (i.e., a shell 210 of the USB connector as described above), so that the grounding interface T4 formed by the grounding member 130 may be in contact with the grounding interface T5 of the storage element 200 in order to accomplish a grounding effect.

Similarly, the structural shape of the grounding member 130 is not limited in the present exemplary embodiment. For instance, in another exemplary embodiment not illustrated, and with reference to FIG. 2, the extending portions of the grounding member may also extend from the first end E1 along two sides (left and right) of the body 110 towards the second end E2. Similarly, the extending portions may also be in contact with the shell 210 of the storage element 200, so that the storage element 200 may accomplish the grounding effect when connecting to the external device 20 through the connecting part 100.

Accordingly, the storage element 200 may accomplish a purpose in converting types of connecting interface through the connecting part 100. Namely, the type of the connecting interface for the connecting part 100 to connect the external device 20 is converted into the connecting interface T1. Meanwhile, when the storage element 200 connects to the connecting interface 21 of the external device 20 through the connecting interface T1 of the connecting part 100, the connecting interface T4 may be electrically connected between the grounding interface T5 of the storage element 200 and a grounding interface 22 of the external device 20. In other words, besides that the storage element 200 and the external device 20 may be electrically connected together through the connecting interfaces T1 and T2 of the connecting part 100 so as to transmit signals, the storage element 200 and the external device 20 may also be electrically connected to the grounding interfaces T5 and 22 through the grounding interface T4 of the connecting part 100 at the same time. Therefore, the storage element 200 and the external device 20 may both accomplish the grounding effect.

Figure 4:
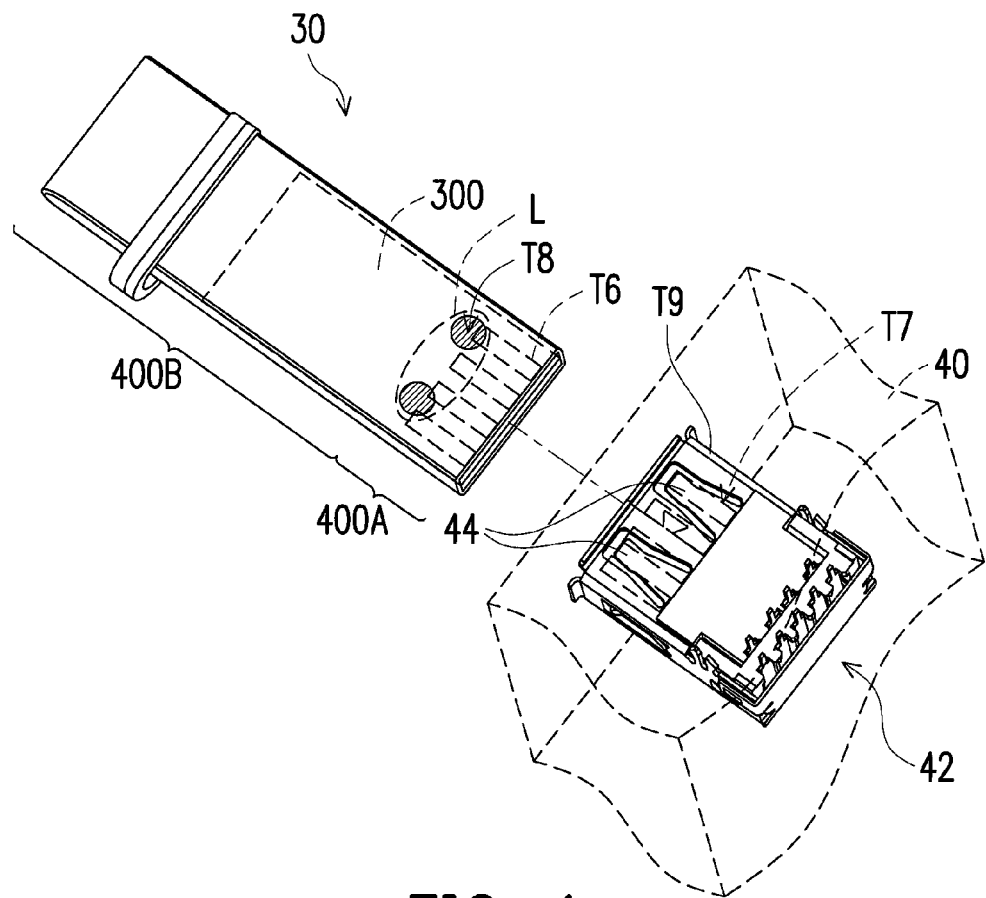
FIG. 4 and FIG. 5 are schematic views illustrating a storage device and a connector according to another exemplary embodiment of the invention.
Figure 5:
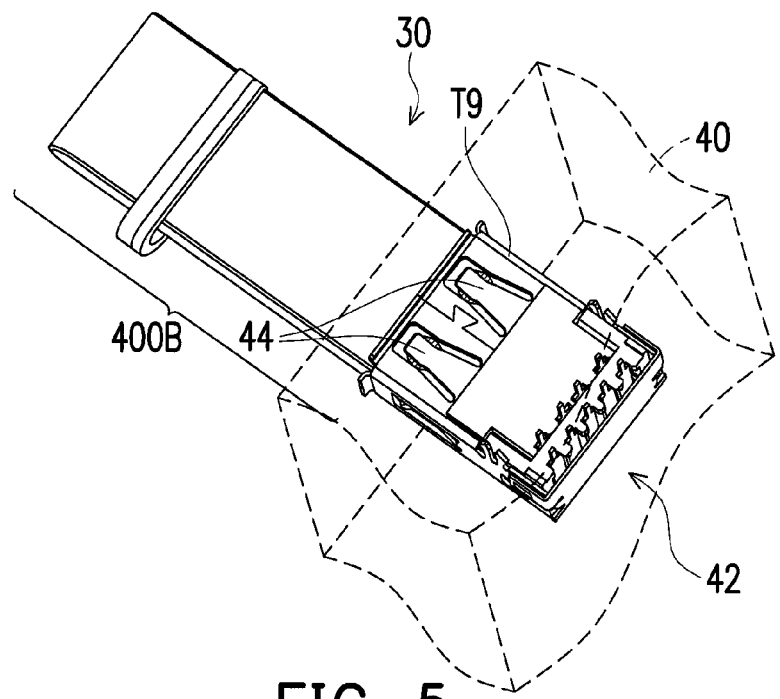
Figure 6:
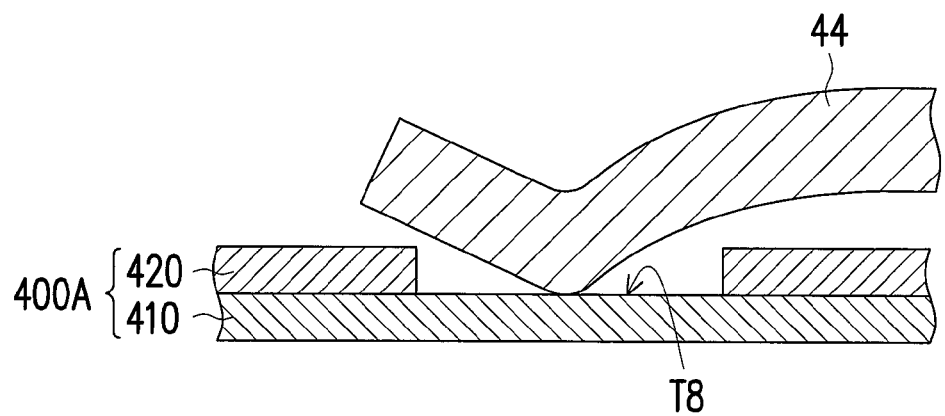
FIG. 6 is a partial cross-sectional view of the storage device and the connector depicted in FIG. 5.

FIG. 4 and FIG. 5 are schematic views illustrating a storage device and a connector according to another exemplary embodiment of the invention. FIG. 6 is a partial cross-sectional view of the storage device and the connector depicted in FIG. 5. Referring to FIG. 4 to FIG. 6 together, in the present exemplary embodiment, a storage device 30 including a connecting interface T6 of a storage element 300 and a first shell 400A is configured to be a connecting part of the storage device 30, and adapted to be connected to a connector 42 of an external device 40 correspondingly.

The connecting interface T6 of the storage element 300 is accommodated in the first shell 400A for connecting to a connecting interface T7 of the connector 42, correspondingly. Further, the first shell 400A further includes a grounding interface T8 capable of contacting a grounding interface T9 of the connector 42 when the connecting interfaces T6 and T7 are correspondingly connected, so as to accomplish the grounding effect for both of said connecting interfaces.

As shown in the figure, the connector 42 is a connecting socket disposed at the external device 40, and the connecting socket includes a shell for forming the grounding interface T9 and the connecting interface T7 disposed therein to be covered by the shell.

More specifically, the storage device 30 further includes a second shell 400B which is an integral structure together with first shell 400A and far away from the connector 42. The storage element 300 is configured to be accommodated in an inner space formed by the first shell 400A and the second shell 400B.

The first shell 400A includes a conductive body 410 and an insulation layer 420 covered on the conductive body 410. The insulation layer 420 is formed by, for example, performing an anodic treatment to a surface (a material of the surface is metal for example) of the conductive body 410, so as to provide an insulation effect and a more preferable appearance. Herein, in order to maintain the grounding effect between the storage device 30 and the external device 40 for preventing possible electrostatic discharge effects, said grounding interface T8 may be formed by exposing the conductive body 410 outside from at least one position on the insulation layer 420 within a range where the first shell 400A is in contact with the connector 42.

Correspondingly, a shell structure (i.e., the grounding interface T9) of the connector 42 has a plurality of elastic arms 44. When the connector 42 is connected to the storage device 30, the first shell 400A is embedded in the shell structure of the connector 42 (and the second shell 400B is exposed outside of the connector 42). Accordingly, besides that the connecting interfaces T6 and T7 may be connected together, the elastic arm 44 may also be leant against the grounding interface T8 formed by a part of the conductive body 410 exposed outside of the insulation layer 420. Meanwhile, the elastic arm 44 also provides a fixing effect for holding the first shell 400A.

Figure 7:
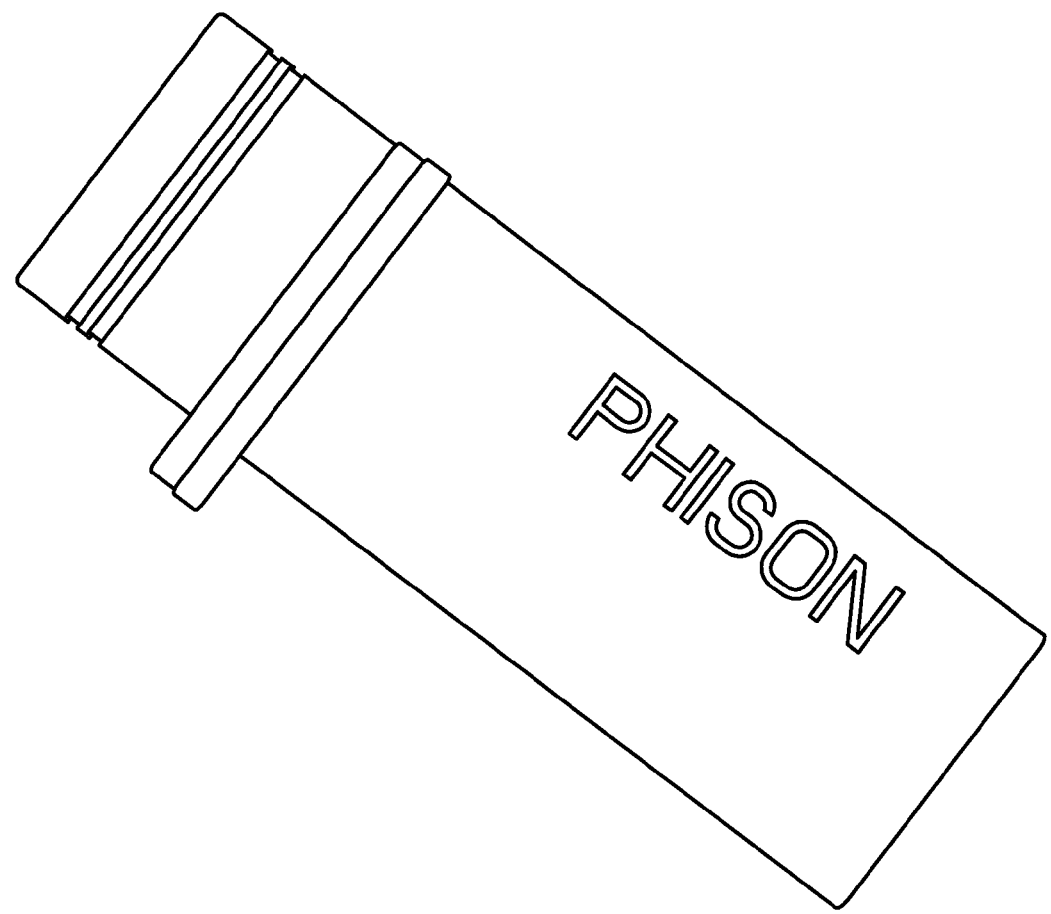
FIG. 7 is a schematic view of a storage device according to another exemplary embodiment of the invention.

In addition, the conductive body 410 exposed outside of the insulation layer 420 belongs to an external appearance portion of the storage device 30. Therefore, in the storage device 30 of the present embodiment, the grounding interface T8 being exposed may become at least a part of a logo (or a mark) L disposed on an external appearance of the first shell 400A, so that the external appearance of the first shell 400A is not ruined by the grounding interface T8. In the present embodiment, the grounding interface T8 is a part of the logo L (e.g., a stroke within the logo (of a pattern or a character) as shown in the figure), and a bending position of the elastic arm 44 faces right to the stroke, such that the bending position of the elastic arm 44 may fall onto the stroke when the shell 400 is embedded in the connector 42. In other exemplary embodiments not illustrated, the grounding interface may also be formed by removing the entire insulation layer on the logo. Accordingly, based on actual requirements for the grounding interface, the designer may adjust dispositions and relations for both the grounding interface and the corresponding logo. FIG. 7 is a schematic view of a storage device according to another embodiment of the invention. Similarly, the grounding interface T8 belongs to one of strokes in a text depicted in FIG. 7.

Figure 8:
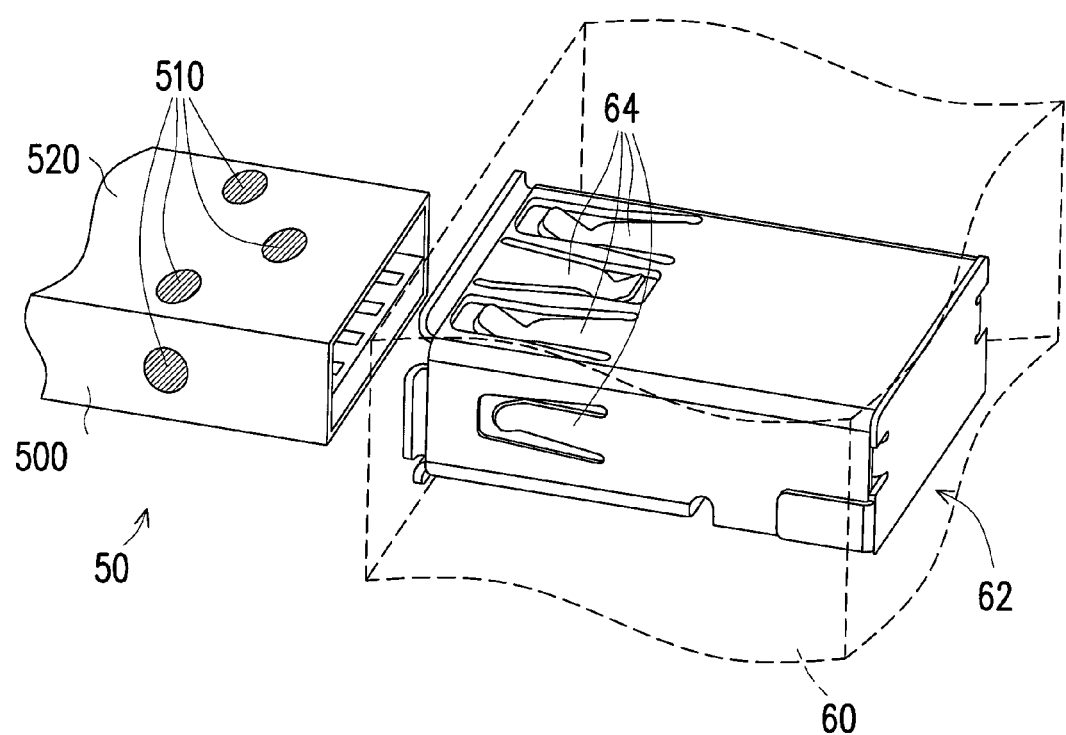
FIG. 8 is a schematic view for assembling a storage device and a connector according to another exemplary embodiment of the invention.

FIG. 8 is a schematic view for assembling a storage device and a connector according to another exemplary embodiment of the invention. Referring to FIG. 8, what is different from the foregoing exemplary embodiments is that, in a storage device 50, grounding interfaces are formed by exposing a conductive body 510 outside of an insulation layer 520 from different surfaces of a shell 500. Correspondingly, a connector 62 of an external device 60 also has a shell structure including a plurality of elastic arms 64, and the elastic arms 64 are corresponding to the said grounding interfaces, respectively. Therefore, when the storage device 50 is connected to the connector 62, the elastic arm 64 is leant against the corresponding grounding interface to accomplish the grounding effect. It can be known that, the conductive body 510 may be exposed outside of the insulation layer 520 at any position within a range where the shell 500 is in contact with the connector 62, so that shell 500 may contact the connector 62 to generate the grounding effect.

In summary, in the foregoing exemplary embodiments of the invention, the connecting part may become a grounding medium for connecting two targets at opposite two sides by disposing the grounding interface crossing different connecting interfaces onto the connector. Namely, any external devices connected to the connecting part can accomplish the grounding effect together with corresponding devices by using the grounding member.

Furthermore, when the storage device performs the conversion for different connecting interfaces by using the connecting part, a status in which the storage element and the connector of the external device are both grounded and electrically connected together may be obtained by using the grounding member of the connecting part. Therefore, the static discharge effect can be effectively prevented.

In addition, by using the grounding interface being exposed to the shell disposed on the storage element, the storage device may accomplish the grounding effect by electrically connecting the grounding interface and the connector of the external device when the connecting part of the storage device is connected to the external device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A connecting part of a storage device, comprising:
   a body having a first end and a second end opposite to each other;
   a plurality of connecting terminals disposed at the first end and the second end respectively; and
   a grounding member assembled to the body, at least a part of the grounding member extending from one of the first end and the second end to another one of the first end and the second end, and the connecting part of the storage device being grounded by contacting the grounding member to a connector of an external device when the connecting part of the storage device is connected to the connector of the external device,
   wherein the grounding member has a socketing portion and at least one extending portion, the socketing portion is socketed at the first end or the second end of the body to cover the connecting terminals disposed at the first end or the second end, the socketing portion is extended from the socketing portion towards the second end or the first end of the body, and the grounding member is grounded by contacting the socketing portion to the connector of the external device,
   wherein the grounding member further comprises a protruding portion disposed on the extending portion, and the protruding portion leans against a second grounding interface of the storage device such that the storage device and the grounding member are grounded with each other.

2. The connecting part of the storage device of claim 1, wherein a first connecting interface is formed by the connecting terminals disposed at the first end, a second connecting interface is formed by the connecting terminals disposed at the second end, and the connecting terminals of the first connecting interface are electrically connected to the connecting terminals of the second connecting interface correspondingly.

3. The connecting part of the storage device of claim 2, wherein the first connecting interface supports micro universal serial bus (Micro-USB), and the second connecting interface supports a universal serial bus (USB).

4. The connecting part of the storage device of claim 1, wherein the body has a locking hook, the extending portion has a buckle hole, and the extending portion is fixed to the body by locking the locking hook to the buckle hole.

5. The connecting part of the storage device of claim 1, wherein the grounding member has a pair of the extending portions extended from the socketing portion along two opposite surfaces of the body respectively, the body has two locking hooks disposed at two opposite surfaces of the body respectively, the pair of the extending portions have a pair of buckle holes, and the pair of the extending portions are fixed to the body by locking the pair of the locking hooks to the pair of the buckle holes.

6. The connecting part of the storage device of claim 1, wherein the storage device further comprises a storage element having a third connecting interface and the second grounding interface, and a first grounding interface crossing the first connecting interface and the second connecting interface is formed by the grounding member,
   wherein the second connecting interface is detachably connected to the third connecting interface to electrically connect the first grounding interface to the second grounding interface, and the storage element is connected to the external device through the first connecting interface so that the first grounding interface is electrically connected between a third grounding interface of the external device and the second grounding interface.

7. A connecting part of a storage device adapted to be electrically connected to an external device, and the connecting part of the storage device comprising:
   a first connecting interface of a storage element, configured to connect a second connecting interface of the external device; and
   a first shell, the first connecting interface being disposed in the first shell, the first shell having a first grounding interface, and the first shell being configured to connect the external device to connect the first connecting interface to the second connecting interface and connect the first grounding interface to a second grounding interface of the external device,
   wherein the first shell has a conductive body and an insulation layer covered on the conductive body, and the conductive body is exposed outside from at least one position on the insulation layer to form the first grounding interface.

8. The connecting part of the storage device of claim 7, wherein the second grounding interface covers the second connecting interface, the second grounding interface has at least one elastic arm, and the first shell is embedded in the second grounding interface while the elastic arm leans against the first grounding interface when the first connecting interface is connected to the second connecting interface.

9. The connecting part of the storage device of claim 7, wherein the first shell the first grounding interface is at least a part of a pattern on the first shell.

10. The connecting part of the storage device of claim 7, wherein the storage device further comprises:
    a second shell forming an integral structure together with the first shell, and the storage element being disposed in the first shell and the second shell.

* * * * *